United States Patent [19]

Chamla et al.

[11] Patent Number: 5,166,281

[45] Date of Patent: Nov. 24, 1992

[54] SUPPORTED POLYOLEFIN CATALYST FOR THE (CO-)POLYMERIZATION OF ETHYLENE IN GAS PHASE

[75] Inventors: Claude Chamla, Marignane; Erick Daire, Martigues, both of France

[73] Assignee: BP Chemicals Limited, London, England

[21] Appl. No.: 846,885

[22] Filed: Mar. 6, 1992

Related U.S. Application Data

[62] Division of Ser. No. 674,620, Mar. 25, 1991, Pat. No. 5,124,296.

[30] Foreign Application Priority Data

Mar. 30, 1990 [FR] France ............................ 90 04563

[51] Int. Cl.$^5$ .............................................. C08H 4/64
[52] U.S. Cl. .................................. 526/125; 526/129; 526/116; 502/108
[58] Field of Search ........................ 526/116, 125, 129

[56] References Cited

U.S. PATENT DOCUMENTS 4,508,843  4/1985  Etherton et al. ............... 502/108
4,942,148  7/1990  Furuhashi et al. ............. 502/108

Primary Examiner—Patrick P. Garvin
Assistant Examiner—Brent M. Peebles
Attorney, Agent, or Firm—Brooks, Haidt Haffner & Delahunty

[57] ABSTRACT

The present invention relates to a catalyst and a process for preparing a catalyst suitable for polymerization of olefins. The process is carried out in a hydrocarbon liquid medium and comprises successively contacting a refractory oxide support with (a) a dialkylmagnesium optionally with a trialkylaluminium, (b) a particular monochloro organic compound, (c) a titanium and/or vanadium compound(s), and then (d) with ethylene optionally mixed with a $C_3$–$C_8$ alpha-olefin in the presence of an organo-aluminium or organozinc compound to form a prepolymerised catalyst. The catalyst has a high activity, particularly in a gas phase polymerization of ethylene, and has a great ability of copolymerizing alpha-olefins with ethylene.

6 Claims, No Drawings

SUPPORTED POLYOLEFIN CATALYST FOR THE (CO-)POLYMERIZATION OF ETHYLENE IN GAS PHASE

This application is a division of application Ser. No. 07/674,620 filed Mar. 25, 1991, now U.S. Pat. No. 5,124,296.

The present invention relates to a solid catalyst of Ziegler-Natta type, suitable for the polymerization or copolymerization of olefins, and to a process for the preparation of the said catalyst.

It is known that olefin polymerization catalyst systems of Ziegler-Natta type consist of a solid catalyst comprising at least one compound of a transition metal belonging to group IV, V or VI of the Periodic Classification of the Elements and of a cocatalyst comprising at least one organometallic compound of a metal belonging to group II or III of this Classification. A high-activity solid catalyst is preferably employed, which comprises at least one compound of a transition metal such as titanium, and a magnesium compound, such as magnesium chloride. The cocatalyst is usually chosen from organoaluminium or organozinc compounds.

European Patent Application EP-A-O 133 383 discloses a supported polyolefin catalyst for the polymerization of ethylene at temperatures greater than 150° C., such as in a solution process or a high pressure process. The catalyst is obtained by treating a dehydrated particulate support material with (a) a dihydrocarbyl magnesium, (b) a transition metal compound and (c) ethyl aluminium dichloride. The catalyst thus obtained may be prepolymerized with at least one alpha-olefin having from 4 to 18 carbon atoms.

Furthermore, a method for the preparation of a solid catalyst is known according to European Patent Application EP-A-0,014,523, which consists in reacting an organomagnesium compound in a liquid hydrocarbon medium with a support based on an inorganic oxide, a "halogenating agent" and a compound of a transition metal, in the presence of a Lewis base. The "halogenating agent" is chosen from a very wide variety of products comprising hydrogen halides, silicon halides, carboxylic acid halides, phosphorus pentachloride, thionyl chloride, sulphuryl chloride, phosgene, nitrosyl chloride, halides of mineral acids, chlorine, bromine, chlorinated polysiloxanes, hydrocarbyl aluminium halides, aluminium chloride, ammonium hexafluorosilicate and hydrocarbyl halides, such as carbon tetrachloride, chloroform, ethyl chloride, ethylene dichloride, or 1,1,1-trichloroethane. It has been found, however, that when such halogenating agents are employed, the solid catalysts generally exhibit a mediocre activity in olefin polymerization. It has also been observed that certain halogenating agents such as hydrogen halides are extremely corrosive towards metals and require the use of special and costly equipment. Furthermore, it has been found that during the catalyst preparation the liquid hydrocarbon medium can be contaminated by the halogenating agent employed, either because the latter is not consumed completely during the reaction, or because it results in the formation of new chlorine-containing compounds which are soluble in this medium and are difficult to separate from the latter. It then becomes necessary to apply a specific treatment to purify the liquid hydrocarbon medium at each catalyst preparation.

The catalysts of EP-A-0,014,523 are described for use in a gas phase olefin polymerization process, e.g. by means of a fluidized-bed reactor in which the polymer particles being formed are kept in the fluidized state by means of a reaction gas mixture containing the olefin(s) to be polymerized and travelling as an upward stream at a velocity which is sufficiently high to effectively remove the heat of polymerization and to maintain the bed in the fluidized state. However, it has been observed that when olefins are polymerized, these catalysts produce polymer particles which, above a certain size, or above a certain degree of progress of polymerization, tend to break up, yielding particles of undesirable shape and size, and of relatively low bulk density. It has also been found that this phenomenon is still more pronounced when ethylene is copolymerized in gas phase with an alpha-olefin containing, for example, from 3 to 8 carbon atoms.

Another major disadvantage of the process of EP-A-0,014,523 stems from the fact that in the conditions for gas phase copolymerization of ethylene with an alpha-olefin containing from 3 to 8 carbon atoms these catalysts require a relatively high partial pressure of the said alpha-olefin in the reaction gas mixture for a given quantity of alpha-olefin to be fixed in the copolymer. A high pressure of this alpha-olefin in the reaction gas mixture increases the losses in particular of this costly raw material when the copolymer powder is recovered and degassed outside the polymerization reactor.

There has now been found a process for the preparation of a solid catalyst of Ziegler-Natta type, supported on a refractory oxide, which exhibits a very high activity in olefin polymerization. Furthermore, this catalyst is prepared in such conditions that the above-mentioned catalyst production disadvantages can be reduced. In particular, the catalyst can be prepared by means of common equipment and in the presence of a liquid hydrocarbon medium which does not require a purification treatment after each catalyst preparation. Moreover, the catalyst has a structure such that the gas phase polymerization of ethylene can be conducted up to a high conversion with reduced risks of bursting the polymer particles and lowering the bulk density of the polymer powder. Furthermore, in the conditions of a gas phase copolymerization of ethylene with at least one alpha-olefin containing from 3 to 8 carbon atoms to produce an ethylene copolymer of a given content of the alpha-olefin(s), the use of this solid catalyst makes it possible, when compared with the catalysts known previously, to reduce in a remarkable manner the partial pressure of the said alpha-olefin(s) in the reaction gas mixture. This advantage not only makes it possible to improve the industrial operating conditions of a gas phase copolymerization process, but also to produce ethylene copolymers which have a density which is markedly reduced for a given proportion of alpha-olefin(s) to ethylene in the reaction gas mixture, compared to that for catalysts known previously.

The subject of the present invention is a process for the preparation of a solid catalyst capable of being employed for the polymerization or copolymerization of olefins especially ethylene, said catalyst comprising atoms of magnesium, chlorine, titanium and/or vanadium, and a solid support based on a refractory oxide, which process is characterized in that it comprises:

a) in a first stage, bringing a solid support based on a refractory oxide containing hydroxyl groups, into contact with a dialkylmagnesium optionally mixed or complexed with a trialkylaluminium, b) in a second stage, bringing the product resulting from the first stage into contact with a monochloro organic compound selected amongst secondary or tertiary alkyl or cycloalkyl monochlorides containing 3 to 19 carbon atoms and amongst compounds of general formula $R^9 R^{10} R^{11} CCl$, in which $R^9$ is an aryl radical containing from 6 to 16 carbon atoms, and $R^{10}$ and $R^{11}$ are identical or different radicals chosen from hydrogen, alkyl radicals containing from 1 to 6 carbon atoms and aryl radicals containing from 6 to 16 carbon atoms, which are identical to or different from $R^9$, c) in a third stage, bringing the product resulting from the second stage into contact with at least one tetravalent titanium or vanadium compound or a trivalent vanadyl compound, and d) in a fourth stage, bringing the product resulting from the third stage into contact with ethylene or ethylene mixed with an alpha-olefin containing from 3 to 8 carbon atoms, in the presence of at least one activating agent selected amongst the organoaluminium and organozinc compounds, in such quantities to obtain the solid catalyst in the form of a prepolymer containing from 1 to 200 g preferably from 10 to 200 g of (co-)polymer of ethylene per milliatom of titanium, or vanadium, or titanium plus vanadium and that the molar ratio of the quantity of the metal(s) (Al and/or Zn) of the activating agent to the quantity of titanium, or vanadium, or titanium plus vanadium is from 0.3 to 10, each of the four stages being performed in a hydrocarbon liquid medium.

The first three stages produce a particular catalytically active intermediate solid product especially comprising a magnesium chloride compound obtained from a particular chlorine source and also at least one compound of titanium or vanadium at its maximum valency of 4 or vanadium at its maximum valency 5 in vanadyl group, these elements being fixed on a solid support based on a refractory oxide. However, this intermediate solid product exhibits disadvantages of catalysts supported on a refractory oxide such as giving in a gas phase polymerisation process low bulk density (co-)polymers of ethylene. The fourth stage of the process of the present invention consists in converting the disadvantageous intermediate solid product into a particular ethylene prepolymerized catalyst, having substantial improvements in a gas phase ethylene (co-)polymerisation, in particular in copolymerising more easily alpha-olefins containing 3 to 8 carbon atoms with ethylene.

The solid support based on refractory oxide contains hydroxyl functional groups and may have a specific surface area (BET) of 50 to 1,000 m²/g e.g. 100 to 600 m²/g and a pore volume of 0.5 to 5 ml/g e.g. 1 to 3 ml/g.

The quantity of hydroxyl groups in the support depends on the support employed, on its specific surface area, on the physicochemical treatment and on the drying to which it may have been subjected beforehand. A support which is ready for use generally contains from 0.1 to 5, preferably from 0.5 to 3 millimoles of hydroxyl group per gram. The support which may be granular, is preferably devoid of free water at the time of its use in the catalyst preparation. For this purpose, it can be preferably rid of free water by means which are known per se, such as a heat treatment ranging from 100° C. to 950° C. e.g. 150° C. to 700° C. The support may be chosen, in particular, from a silica, an alumina, a silica-alumina, or a mixture of these oxides, and may consist of particles which have a mass-mean diameter ranging from 20 to 250 microns, preferably 30 to 200 microns, especially 50 to 150 microns. The use of a silica is preferred, especially ones sold by Crosfield Company (Great Britain) under the commercial reference "SD 490" or by W. R. Grace Company (USA) under the commercial reference "SG 332" or a microspheroidal silica sold by W. R. Grace Company (USA) under the commercial reference "SD 3217".

The first stage of the preparation of the solid catalyst consists in bringing the solid support into contact with a dialkylmagnesium of general formula $$MgR^1R^2$$

optionally mixed or complexed with a trialkylaluminium of general formula $$AlR^3R^4R^5$$

in which formulae $R^1$, $R^2$, $R^3$, $R^4$ and $R^5$ are identical or different alkyl radicals containing from 1 to 12 carbon atoms, preferably from 2 to 8 carbon atoms, the quantity of trialkylaluminium used preferably not exceeding a molar ratio of 1/1 relative to the dialkylmagnesium in particular the molar ratio being 0.01/1 to 1/1, e.g. 0.1/1 to 0.5/1. Dibutylmagnesium, dihexylmagnesium, butylethylmagnesium, ethylhexylmagnesium or butyloctylmagnesium is preferably employed.

When the dialkylmagnesium is employed with a trialkylaluminium, an addition compound of general formula $$MgR^1R^2.xAlR^3R^4R^5$$

can be prepared beforehand, in which formula $R^1$, $R^2$, $R^3$, $R^4$ and $R^5$ are defined as above and x is a number equal to or lower than 1 in particular from 0.01 to 1, e.g. from 0.01 to 0.5. The addition compound is prepared according to known methods, such as heating a mixture of dialkylmagnesium and trialkylaluminium in solution in a liquid hydrocarbon medium to a temperature ranging, preferably, from 30° to 100° C. A compound of addition of dibutylmagnesium with triethylaluminium, or else dihexylmagnesium with triethylaluminium, or else butyloctylmagnesium with triethylaluminium, is preferably employed.

In all cases the dialkylmagnesium, and, if present, the trialkylaluminium or the addition compound is preferably added in the first stage in the form of a solution in a liquid hydrocarbon e.g. alkane or cycloalkane, such as n-hexane or n-heptane.

The first stage, like the other three stages of the catalyst preparation, is carried out in a hydrocarbon liquid medium consisting of at least one liquid saturated hydrocarbon e.g. alkane or cycloalkane, having from 4 to 12 carbon atoms, e.g. 4 to 8 carbon atoms, such as n-butane, n-pentane, isopentane, n-hexane n-heptane or cyclohexane, this hydrocarbon being inert towards the various compounds involved in the preparation of the solid catalyst. The hydrocarbon liquid medium may be the same or different in each stage of the catalyst preparation.

During the first stage, the dialkylmagnesium and the trialkylaluminium, if employed, will be fixed on the solid support. This fixing may result simultaneously from a reaction between the hydroxyl groups of the solid support and the organometallic compounds, and from a physicochemical absorption, probably partly due to the organometallic compounds being complexed by some oxygen atoms of the refractory oxide. These organometallic compounds can themselves become fixed on the support in a complexed form, in particular in dimeric or trimeric form. A support can be generally evaluated using its overall capacity for fixing a dialkylmagnesium and optionally a trialkylaluminium. Its maximum fixing capacity depends on the nature of the support, on its specific surface area, on the physicochemical treatment and on the drying to which the support may have been subjected beforehand. The maximum fixing capacity of a support can be generally from 1 to 5, preferably from 1 to 3 millimoles of dialkylmagnesium e.g. dibutylmagnesium or trialkylaluminium per gram of support.

The molar quantity of dialkylmagnesium and optionally of trialkylaluminium to be used can be less than, identical to, or in an excess relative to the number of moles of hydroxyl groups present in the support. However, in order to avoid using an excessive quantity of dialkylmagnesium and optionally trialkylaluminium, the quantity of these compounds is generally slightly higher than the maximum quantity capable of being fixed on the solid support. Thus, in the first stage of the process it is preferred to contact each gram of support with a quantity of the dialkylmagnesium, or dialkylmagnesium plus trialkylaluminium corresponding to 0.1 to 7.5 millimoles, preferably from 0.5 to 4.5 millimoles and more particularly from 1 to 3.5 millimoles.

The first stage can be carried out in various ways. It is possible, for example, to add the dialkylmagnesium and optionally the trialkylaluminium to the solid support which has preferably been suspended beforehand in the hydrocarbon liquid medium. This addition can be carried out slowly, for example over a period of 10 to 300 e.g. 30 to 120 minutes, with agitation e.g. stirring and at a temperature of 0° C. to 80° C., e.g. 10° to 60° C. When a dialkylmagnesium and a trialkylaluminium are both employed, their contact with the solid support can be brought about either by successive addition of the two organometallic compounds in any order or by addition of the mixture or complex formed beforehand by these two organometallic compounds, to the hydrocarbon liquid medium containing the solid support.

Any significant excess of organometallic compound which is not fixed in the support can be removed by filtration and/or by one or more washings with a hydrocarbon liquid. It has been found, however, that it is possible to use a molar quantity of dialkylmagnesium and optionally of trialkylaluminium which can go up to 1.5 times the quantity of organometallic compounds corresponding to the maximum fixing capacity of the support, without it being subsequently necessary to remove by washings the excess of organometallic compounds which are not fixed in the support. It has surprisingly been found that in these conditions the possible small excess quantity of organometallic compounds which are not fixed in the support does not in any way interfere with the catalyst preparation and that substantially no fine particles can be formed during the subsequent stages.

The second stage of the preparation of the solid catalyst consists in bringing the solid product resulting from the first stage into contact with a monochloro organic compound. This compound may be a secondary or preferably tertiary alkyl monochloride containing 3 to 19, preferably 3 to 13 carbon atoms and having the general formula $$R^6R^7R^8CCl$$

in which $R^6$ and $R^7$ are identical or different alkyl radicals containing from 1 to 6 e.g. 1 to 4 carbon atoms such as methyl, ethyl or n-propyl and $R^8$ is a hydrogen atom or, preferably, an alkyl radical containing from 1 to 6 e.g. 1 to 4 carbon atoms, identical to or different from $R^6$ and $R^7$, such as methyl, ethyl or n-propyl. Secondary propyl chloride, secondary butyl chloride, but especially tert-butyl chloride are preferred.

The monochloro organic compound may also be a secondary or preferably tertiary cycloalkyl monochloride of general formula

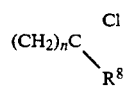

in which $R^8$ is a hydrogen atom or, preferably, an alkyl radical containing from 1 to 6, e.g. 1 to 4 carbon atoms such as methyl or ethyl and n is a number from 4 to 8, e.g. 5 to 8, especially 5, such as cyclohexyl chloride or 1-methyl-1 chlorocyclohexane.

The monochloro organic compound can also be a compound containing at least one aryl radical, of general formula: $R^9R^{10}R^{11}CCl$, in which $R^9$ is an aryl radical containing from 6 to 16 e.g. 6 to 10 carbon atoms and $R^{10}$ and $R^{11}$ are identical or different radicals chosen from hydrogen, alkyl radicals containing from 1 to 6 e.g. 1 to 4 carbon atoms such as methyl, ethyl or n-propyl, and aryl radicals containing from 6 to 16 e.g. 6 to 10 carbon atoms, identical to or different from $R^9$. The aryl radicals for $R^9, R^{10}$ and/or $R^{11}$ are usually aromatic hydrocarbyl groups such as phenyl, totyl or naphthyl. Benzyl chloride and 1-phenyl-1-chloroethane may be preferred.

It has surprisingly been found that the chlorination of the organometallic compounds fixed in the solid support is considerably improved by the use of secondary or tertiary alkyl or cycloalkyl monochlorides or the use of monochloro organic compounds containing at least one aryl radical compared to the use of hydrocarbyl polychlorides in particular carbon tetrachloride.

By virtue of its unexpected behaviour, the monochloro organic compound can be used during this stage in a relatively low quantity, nevertheless making it possible to form a solid product substantially free from basic functional groups which are capable of subsequently reducing a compound of a transition metal such as tetravalent titanium employed during the third stage. The proportion of residual reductive basic functional groups is such that less than 10%, preferably less than 5% of the transition metal of the intermediate solid product resulting from the third stage is in the reduced state.

The product resulting from the first stage may be contacted with the monochloro organic compound in a quantity such that the molar ratio of the quantity of monochloro organic compound to the quantity of the magnesium, or magnesium plus aluminium contained in the product resulting from the first stage is from 1 to 3.5, preferably 1.5 to 3.0.

It has surprisingly been found that when this particular quantity of monochloro organic compound is used, the product resulting from the second stage can contain reduced amounts of basic functional groups capable of reducing a compound of a transition metal at its maximum valency or even hardly any or especially none compared to the use of corresponding amounts of hydrocarbyl polychlorides. The residual quantity (if any) of monochloro organic compound at the end of this stage is generally practically nil or negligible and usually does not exceed approximately 1,000 parts per million by weight (ppm) in the liquid hydrocarbon medium. It is thus therefore no longer necessary to wash the solid product resulting from the second stage and to purify the liquid hydrocarbon medium after each catalyst preparation.

The second stage is carried out in the hydrocarbon liquid medium by bringing the monochloro organic compound into contact with the product resulting from the first stage, at a temperature ranging from 0° C. to 90° C., preferably from 20° C. to 60° C. The operation can be carried out in various ways, for example by adding the monochloro organic compound to the product resulting from the first stage in suspension in the hydrocarbon liquid medium. This addition is carried out, preferably slowly, for example, over a period of 10 to 600 minutes e.g. 20 to 300 minutes and with agitation e.g. stirring.

The third stage of the preparation of the solid catalyst consists in bringing the product resulting from the second stage into contact with at least one compound of titanium or vanadium at the maximum valency of 4, or with a vanadyl compound with vanadium at the valency of 5. These titanium or vanadium compounds are preferably soluble in the hydrocarbon liquid medium in which the catalyst is prepared. It is possible to choose, in particular, a tetravalent titanium compound of general formula $$Ti(OR)_m X_{4-m}$$

a tetravalent vanadium compound of general formula $$V(OR)_m X_{4-m}$$

or a vanadyl compound of general formula $$VO(OR)_n X_{3-n}$$

in which formulae R is an alkyl radical containing from 1 to 6, e.g. 2 to 6 such as 2 to 4 carbon atoms e.g. methyl, ethyl, propyl, isopropyl or butyl, X is a chlorine or bromine atom, m is a whole or fractional number equal to or greater than 0 and smaller than 4 e.g. 0 to 3, and n is a whole or fractional number equal to or greater than 0 and smaller than 3, e.g. 0 to 2.

The use of titanium tetrachloride is preferred.

The contact is brought about in the liquid hydrocarbon medium, so that a maximum quantity of titanium and/or vanadium compounds can be fixed by impregnation in the support, preferably while avoiding any reduction of these transition metals, as this generally leads to reduce activity of the catalyst in ethylene (co-)polymerization. For this reason the product resulting from the second stage is preferably substantially free from any basic functional group capable of reducing a titanium and/or vanadium compound. It has been surprisingly found, furthermore, that the product obtained under the particular circumstances of chlorination during the second stage is particularly capable of fixing a large amount of titanium and/or vanadium compounds. This makes it possible to contact the product resulting from the second stage with the titanium and/or vanadium compound(s) in a quantity which is substantially lower than that employed during the impregnation stage described in EP-A-0,014,523, in particular a quantity such that the atomic ratio of the quantity of titanium, or vanadium, or titanium plus vanadium to the quantity of the magnesium, or magnesium plus aluminium contained in the product resulting from the second stage is from 0.1 to 0.9, preferably 0.2 to 0.7. As a result of this, most, if not all, of the quantity of titanium and/or vanadium compound(s) used is found to be fixed in the support preferably with an unchanged valency state. It is found that at the end of this stage the quantity of titanium and/or vanadium compound(s) remaining in the free state in the liquid hydrocarbon medium can be relatively low or negligible. Advantageously, in certain cases it appears to be no longer necessary to wash the solid product resulting from the third stage.

The third stage is generally carried out at a temperature ranging from 0° to 150° C., preferably from 20° to 120° C. In practice the operation can be carried out in various ways. For example, the titanium and/or vanadium compound(s) can be added to the product resulting from the second stage in suspension in the hydrocarbon liquid medium. This addition is preferably performed slowly, for example over a period of 10 to 300 minutes e.g. 20 to 200 minutes, and with agitation e.g. stirring.

According to a preferred embodiment, the third stage can be carried out in a way which advantageously makes it possible to yield a solid catalyst having a particularly high activity in ethylene polymerization or copolymerization and which produces ethylene (co-)polymers with a narrow molecular weight distribution. It consists especially in bringing the product resulting from the second stage into contact first of all with at least one halogen-rich titanium or vanadium compound, and then with at least one titanium or vanadium compound containing little or no halogen preferably at least one alkoxide-rich titanium or vanadium compound. The halogen-rich titanium or vanadium compound is chosen in particular from a tetravalent titanium compound of general formula $$Ti(OR)_p X_{4-p}$$

a tetravalent vanadium compound of general formula $$VO(OR)_p X_{4-p}$$

and a vanadyl compound of general formula $$VO(OR)_q X_{3-q}$$

in which formulae R and X have definitions identical to those above, p is a whole or fractional number equal to or greater than 0 and smaller than 2 e.g. 0 to 1.5, or 0 to 1 and q is a whole or fractional number equal to or greater than 0 and smaller than 1.5 e.g. 0 to 1 or 0 to 0.5. The halogen-rich titanium or vanadium compound is preferably titanium tetrachloride, vanadium tetrachloride or vanadyl trichloride. The use of titanium tetrachloride is preferred.

The alkoxide-rich titanium or vanadium compound containing little or no halogen is chosen in particular from a tetravalent titanium compound of general formula $$Ti(OR)_rX_{4-r}$$

a tetravalent vanadium compound of general formula $$V(OR)_rX_{4-r}$$

and a vanadyl compound of general formula $$VO(OR)_sX_{3-s}$$

in which formulae R and X have definitions identical to those above, r is a whole or fractional number equal to or greater than 2 and smaller than or equal to 4 e.g. 2.5 to 4, or 3 to 4 and s is a whole or fractional number equal to or greater than 1.5 and smaller than or equal to 3 e.g. 2 to 3, or 2.5 to 3. In particular, the alkoxide-rich compound containing little or no halogen is preferably a titanium tetraalkoxide, a vanadium tetraalkoxide and a vanadyl trialkoxide, especially titanium or vanadium tetraisopropoxide, titanium or vanadium tetra-n-propoxide, titanium or vanadium tetrabutoxide, titanium or vanadium tetraethoxide, vanadyl tri-n-propoxide, vanadyl tributoxide and vanadyl triethoxide.

The proportion of alkoxide-rich titanium or vanadium compounds containing little or no halogen relative to the halogen-rich ones which is used during this stage can be such that the molar ratio of the former to the latter is from 0.1 to 3, preferably 0.2 to 2.

The conditions in which the two successive contacts are brought about correspond to those defined above for a single contact. In particular the total quantity of titanium and/or vanadium compounds is such that the atomic ratio of the total quantity of titanium, or vanadium, or titanium plus vanadium to the quantity of the magnesium, or magnesium plus aluminium contained in the product resulting from the second stage is from 0.1 to 0.9, preferably 0.2 to 0.7.

The solid product resulting from the third stage comprises a support based on a refractory oxide containing halogenated compounds of magnesium, tetravalent titanium and/or vanadium and/or trivalent vanadyl. The atomic ratio between the quantity of magnesium and the quantity of titanium and/or vanadium in the solid product may be generally from 2 to 8, preferably from 2.5 to 5.

The fourth stage of the preparation of the solid catalyst consists in bringing the solid product resulting from the third stage, also called intermediate solid product, into contact with ethylene or ethylene mixed with an alpha-olefin containing from 3 to 8 carbon atoms, in the presence of at least one organoaluminium or organozinc compound. The contact may be carried out in a batchwise or continuously and is preferably brought about by adding to the solid product resulting from the third stage, in suspension in the hydrocarbon liquid medium, ethylene and optionally an alpha-olefin containing 3 to 8 carbon atoms, e.g. propylene, butene-1, hexene-1, methyl-4-pentene-1 or octene-1, preferably at a steady slow flow rate and over a period such that the solid catalyst obtained is in the form of a prepolymer containing from 1 to 200 g, preferably from 10 to 200 g, e.g. 20 to 100 g of polymer per milliatom of titanium, or vanadium, or titanium plus vanadium. The alpha-olefin optionally employed mixed with the ethylene is used in a minor quantity compared to ethylene, preferably such that the proportion of copolymerized alpha-olefin in the prepolymer is not higher than 10% by weight and preferably from 0.1 to 7% by weight relative to the ethylene. The ethylene prepolymerised catalyst thus obtained at the end of the fourth stage comprises a (co-)polymer of ethylene having a relatively high crystallinity and a low solubility in liquid hydrocarbon and presents a particular high capability of incorporating $C_3$ to $C_8$ alpha-olefins in an ethylene copolymer during a copolymerisation. The contact in the fourth stage can be generally brought about with agitation, e.g. stirring, at a temperature which is generally between 10° C. and 100° C., preferably between 40° C. and 90° C., and at a pressure which is generally higher than atmospheric pressure and lower than 2 MPa e.g. 0.2 to 1 MPa. The duration of this contact can be of 10 to 900 minutes, e.g. 30 to 600 minutes.

This contact may be advantageously brought about in the presence of hydrogen, which may be added to the reaction mixture once at the beginning of the contact, or else a number of times, or also slowly at a steady flow rate while the contact is brought about. The quantity of hydrogen used during this stage is such that the partial pressure of hydrogen may be from 0.01 to 1 MPa e.g. 0.05 to 0.5 MPa. The presence of hydrogen during this stage, even in a very small quantity, makes it possible subsequently to manufacture ethylene polymers or copolymers with a perfectly homogeneous composition, in particular ones free from gels.

The contact in the fourth stage is brought about in the presence of an activating agent chosen from organoaluminium compounds such as trialkylaluminium or alkylaluminium hydrides, chlorides and alcoholates, or organozinc compounds such as diethylzinc. The activating agent may be added to the liquid hydrocarbon medium either once at the beginning of the contact or a number of times distributed between the beginning and the end while the contact is brought about. The quantity of activating agent used during this stage is such that the atomic ratio between the quantity of the metal(s) (Al and/or Zn) of the activating agent and the quantity of titanium, or vanadium, or titanium plus vanadium is from 0.3 to 10, preferably 0.7 to 5, e.g. 0.8 to 3.

An electron-donor compound such as a Lewis base can be employed during any one of the four stages, but is not essential. On the contrary, it is better not to employ a compound of this type because its presence rapidly decreases the activity of the solid catalyst in ethylene (co-)polymerization. Preferably the electron-donor compound is substantially absent. The quantity of electron-donor compound added, if it is used, in the preparation of the solid catalyst may be limited to a very small proportion, in particular such that the molar ratio of the quantity of electron-donor compound to the quantity of titanium, or vanadium, or titanium magnesium plus vanadium is lower than 1/5 e.g. from 0 to 0.2, preferably than 1/10 e.g. from 0 to 0.1, and that the molar ratio of the quantity of electron-donor compound to the quantity of the magnesium, or magnesium plus aluminium is lower than 1/10 e.g. from 0 to 0.1, preferably lower than 1/20 e.g. from 0 to 0.05. The electron-donor compound may be an organic electron-donor compound free from labile hydrogen, e.g. selected amongst ether, thioether, amine, amide, phosphine, sulfoxide, phosphoramide, silane, or ester.

The catalyst obtained after this last stage is a solid ethylene prepolymerised catalyst of Ziegler-Natta type based on titanium and/or vanadium, capable of being employed for the polymerization or copolymerization of olefins. It comprises the essential elements already existing in the intermediate solid product obtained at the end of the third stage in similar proportions, in particular a refractory oxide and atoms of chlorine, magnesium, titanium and/or vanadium, and additionally comprises an organoaluminium compound and/or an organozinc compound. More precisely, this catalyst comprises, per milliatom of titanium, or vanadium, or titanium plus vanadium, from 1 to 200 g, preferably from 10 to 200 g of polyethylene or of a copolymer of ethylene with a minor amount of an alpha-olefin containing 3 to 8 carbon atoms, from 0.2 to 15 g, preferably from 0.3 to 10 g of a refractory oxide, from 1 to 10, preferably from 1.4 to 5 milliatoms of magnesium, from 0.1 to 20, preferably from 0.3 to 10 milliatoms of aluminium, or zinc, or aluminium plus zinc, and from 0 to a value less than 0.2, preferably from 0 to 0.1 e.g. 0.001 to 0.08 millimole of an electron-donor compound. This solid catalyst is in the form of non-sticky particles which may have a mass-mean diameter of 50 to 500 microns, preferably 80 to 400 microns, e.g. 100 to 300 microns and a bulk density ranging from 0.25 to 0.60 preferably from 0.3 to 0.5, e.g. 0.4 to 0.5 g/cm$^3$.

The solid catalyst obtained at the end of the fourth stage may be advantageously washed one or more times with a liquid hydrocarbon e.g. an alkane such as n-hexane, and can be employed as such, directly in a gas phase ethylene polymerization or copolymerization, in particular in a fluidized-bed reactor. It can be isolated, if desired, from the hydrocarbon liquid medium in which it was prepared or with which it was washed, for example by evaporating the latter at a temperature which can range up to 100° C. e.g. 10° to 80° C. and optionally under a partial vacuum.

The solid catalyst prepared according to the present invention is particularly suitable for the gas phase polymerization of ethylene and especially for the gas phase copolymerization of ethylene with at least one alpha-olefin containing from 3 to 8 carbon atoms e.g. propylene, butene-1, hexene-1, methyl-4-pentene-1, or octene-1, in particular high density polyethylene (density: 0.94 to 0.97 g/cm$^3$), and linear low density polyethylene or very low density polyethylene (density: 0.88 to 0.94 g/cm$^3$) having from 3 to 30% e.g. 5 to 25% by weight of C3 to C8 alpha-olefins, for example by means of a fluidized-bed reactor, at a temperature of 20° C. to 110° C., preferably 40° and 100° C., under a total pressure which can vary from 0.5 to 5 MPa, the ratio of the partial pressure of the alpha-olefin(s) to that of ethylene being of 0.01 to 0.5, preferably 0.02 to 0.45 e.g. 0.03 to 0.43. The solid catalyst is preferably employed conjointly with a cocatalyst. The latter may be chosen from organoaluminium and organozinc compounds identical to or different from the activating agent used during the fourth stage of the preparation of the catalyst. It may be introduced into the polymerization medium simultaneously with or separately from the solid catalyst in an amount such that the atomic ratio of the metal(s) (Al and/or Zn) of the cocatalyst to titanium, or vanadium, or titanium plus vanadium is from 0.1 to 10, preferably 0.2 to 5. The gas phase ethylene polymerization or copolymerization carried out in the presence of the solid catalyst prepared according to the present invention has the advantage of progressing to a high conversion without a substantial drop of the bulk density (0.32 to 0.45 g/cm$^3$) of the polymer or copolymer powder produced which may have a Ti and/or V content from 1 to 15 ppm, preferably 2 to 10 ppm.

Furthermore, for manufacturing an ethylene copolymer of a given alpha-olefin content, the solid catalyst prepared according to the present invention requires a relatively low proportion of alpha-olefin relative to ethylene in the reaction gas mixture employed for the gas phase copolymerization. The solid catalyst of the present invention has the specific property of incorporating a particularly high content of a C3 to C8 alpha-olefin, e.g. butene-1 or methyl-4-pentene-1, in an ethylene copolymer during a gas phase copolymerisation under a total pressure of 1.5 MPa, the said property being expressed by at least one of the following equations:

$$A = a \times (pC4/pC2) \qquad (1)$$

wherein A is the butene-1 content by weight of an ethylene/butene-1 copolymer prepared at 95° C. in a gas phase copolymerisation carried out with the catalyst of the present invention in the presence of a reaction gas mixture containing ethylene and butene-1, (pC4/pC2) is the ratio of the partial pressure of butene-1 to that of ethylene in the said reaction gas mixture ranging from 0 to 0.43, preferably from 0.01 to 0.36 e.g. 0.01 to 0.1, and a is a number from 50 to 70, preferably 60 to 70;

$$B = b \times (pC6/pC2) \qquad (2)$$

wherein B is the methyl-4-pentene-1 content by weight of an ethylene/methyl-4 pentene-1 copolymer prepared at 70° C. in a gas phase copolymerisation carried out with the catalyst of the present invention in the presence of a reaction gas mixture containing ethylene and methyl-4 pentene-1, (pC6/pC2) is the ratio of the partial pressure of methyl-4 pentene-1 to that of ethylene in the said reaction gas mixture ranging from 0 to 0.3, preferably from 0.01 to 0.25 e.g. 0.01 to 0.1, and b is a number from 80 to 100, preferably 90 to 100.

The following nonlimiting examples illustrate the present invention. In the Tables 1, 2 and 3, the productivity is expressed in grams of (co-)polymer per milliatom of Ti or V; $MI_{2.16}$ is the melt index of (co-)polymer measured according to the standard method ASTM-D-1238, condition E; BD is the bulk density of (co-)polymer powder at rest; pC4/pC2 is the ratio of the partial pressure of butene-1 to that of ethylene in the reaction gas mixture.

EXAMPLE 1

Preparation of a Catalyst

A support was employed, consisting of an "SD 490" Registered Trademark silica powder sold by Crosfield Company (Great Britain) which had specific surface area (BET) of 300 m$^2$/g and a pore volume of 1.7 ml/g. It consisted of particles having a mass-mean diameter of 100 microns. It was dried for 5 hours at 500° C., in an air atmosphere, to obtain a silica powder rid of free water and containing 1 millimole of hydroxyl group per gram. All the subsequent operations were carried out under an inert nitrogen atmosphere.

600 ml of n-hexane and 60 g of the dried silica were introduced into a stainless steel 1-liter reactor fitted with a stirrer rotating at 250 revolutions per minute, followed slowly over 1 hour by 190 millimoles of dibutylmagnesium, at a temperature of 20° C. The mixture thus obtained was stirred at 20° C. for 1 hour. The solid product (A) thus obtained was washed three times, each with 600 ml of n-hexane at 20° C. and after these washings it contained 1.7 milliatoms of magnesium per gram of silica.

The reactor containing the solid product (A) in suspension in 600 ml of n-hexane was then heated to 50° C. 204 millimoles of tert-butyl chloride were introduced into the reactor slowly over 1 hour with stirring. At the end of this time the mixture was stirred at 50° C. for 1 hour and was then cooled to room temperature (20° C.). The solid product (B) obtained was washed three times, each with 600 ml of n-hexane at 20° C. After these washings it contained 1.7 milliatoms of magnesium and 2.7 milliatoms of chlorine per gram of silica, and substantially no basic functional group reductive towards titanium tetrachloride.

The reactor containing a quantity of the solid product (B) containing 30 g of silica in suspension in 600 ml of n-hexane was then heated to 25° C. 15.3 millimoles of titanium tetrachloride were introduced into the reactor slowly over 1 hour with stirring. The mixture obtained was stirred at 25° C. for 1 hour. 15.3 millimoles of titanium tetraisopropoxide were then introduced slowly over 1 hour with stirring into the reactor, which was kept at 25° C. The mixture obtained was then stirred at 25° C. for 1 hour and was then cooled to room temperature (20° C.). The solid product (C) obtained was washed three times, each time with 600 ml of n-hexane at 20° C. After these washings, it contained 1.7 milliatoms of magnesium, 3.9 milliatoms of chlorine and 0.45 milliatoms of tetravalent titanium per gram of silica, and substantially no trivalent titanium.

2 liters of n-hexane, 10.8 millimoles of tri-n-octylaluminium and a quantity of solid product (C) containing 6 milliatoms of titanium were introduced into a stainless steel 5-liter reactor fitted with a stirrer rotating at 750 revolutions per minute and heated to 70° C. A volume of 280 ml of hydrogen, measured under normal conditions, was then introduced therein, followed by ethylene at a steady rate of 160 g/h for 3 hours. At the end of this time the reactor was degassed and its content was transferred to a rotary evaporator where the n-hexane was evaporated off at 60° C. under a partial vacuum. The solid catalyst (D) which was ready for use was thus obtained in the form of a prepolymer powder consisting of particles which had a mass-mean diameter of 250 microns and contained 80 g of polyethylene per milliatom of titanium.

EXAMPLE 2

Preparation of a Catalyst

The operation was carried out exactly as in Example 1 for the preparation of solid products (A) and (B). Next, 600 ml of n-hexane and a quantity of the solid product (B) containing 30 g of silica were introduced into a stainless steel 1-liter reactor fitted with a stirrer system rotating at 250 revolutions per minute and heated to 50° C., followed slowly by 25.5 millimoles of titanium tetrachloride over 1 hour. The mixture obtained was then stirred at 50° C. for 1 hour and was then cooled to room temperature (20° C.). The solid product (E) obtained was washed three times, each time with 600 ml of n-hexane at 20° C. After these washings, it contained 1.7 milliatoms of magnesium, 4.8 milliatoms of chlorine and 0.54 milliatoms of tetravalent titanium per gram of silica, and substantially no trivalent titanium.

2 liters of n-hexane, 18 millimoles of tri-n-octylaluminium and a quantity of solid product (E) containing 6 milliatoms of titanium were introduced into a stainless steel 5-liter reactor fitted with a stirrer device rotating at 750 revolutions per minute and heated to 70° C. A volume of 400 ml of hydrogen, measured under normal conditions, was then introduced therein, followed by ethylene at a steady rate of 100 g/h for 3 hours. At the end of this time the reactor was degassed and its content was transferred to a rotary evaporator where the n-hexane was evaporated off at 60° C. under a partial vacuum. The solid catalyst (F) which was ready for use was thus obtained in the form of a prepolymer powder consisting of particles with a mass-mean diameter of 220 microns and containing 50 g of polyethylene per milliatom of titanium.

EXAMPLE 3

Preparation of a Catalyst

The operation was carried out exactly as in Example 2 for the preparation of the solid products (A), (B) and (E).

Next, 2 liters of n-hexane, 10.8 millimoles of tri-n-octylaluminium and a quantity of solid product (E) containing 6 milliatoms of titanium were introduced into a stainless steel 5-liter reactor fitted with a stirrer device rotating at 750 revolutions per minute and heated to 70° C. A volume of 400 ml of hydrogen, measured under normal conditions, was then introduced therein, followed by ethylene at a steady rate of 160 g/h for 3 hours. At the end of this time 7.2 millimoles of tri-n-octylaluminium were added to the mixture and the reactor was then degassed and its content was transferred to a rotary evaporator, where the n-hexane was evaporated off at 60° C. under a partial vacuum. The solid catalyst (G) which was ready for use was thus obtained in the form of a powder consisting of particles which had a mass-mean diameter of 260 microns and contained 80 g of polyethylene per milliatom of titanium.

EXAMPLE 4

Preparation of a Catalyst

The operation was carried out exactly as in Example 1 for the preparation of the solid product (A).

Next, 600 ml of n-hexane and a quantity of the solid product (A) containing 60 g of silica were introduced into a stainless steel 1-liter reactor fitted with a stirrer rotating at 250 revolutions per minute and heated to 50° C., followed slowly over 1 hour by 306 millimoles of tert-butyl chloride. At the end of this time the mixture was stirred at 50° C. for 1 hour and was then cooled to room temperature (20° C.). The solid product (H) obtained was washed three times, each time with 600 ml of n-hexane at 20° C. After these washings it contained 1.6 milliatoms of magnesium and 3.2 milliatoms of chlorine per gram of silica, and substantially no functional group reductive towards titanium tetrachloride.

The reactor containing a quantity of the solid product (H) containing 30 g of silica, in suspension in 600 ml of n-hexane, was then heated to 50° C. 24 millimoles of titanium tetrachloride were introduced into the reactor slowly over 1 hour with stirring. At the end of this time the mixture was stirred at 50° C. for 1 hour and was then cooled to room temperature (20° C.). The solid product (I) obtained was washed three times, each time with 600 ml of n-hexane at 20° C. After these washings it contained 1.6 milliatoms of magnesium, 4.25 milliatoms of chlorine and 0.49 milliatoms of tetravalent titanium per gram of silica, and substantially no trivalent titanium.

Two litres of n-hexane, 9.6 millimoles of tri-n-octylaluminium and a quantity of the solid product (I) containing 6 milliatoms of titanium were introduced into a stainless steel 5-liter reactor fitted with a stirrer rotating at 750 revolutions per minute and heated to 70° C. A volume of 400 ml of hydrogen, measured under normal conditions, was then introduced therein, followed by ethylene at a steady rate of 160 g/h for 3 hours. At the end of this time the reactor was degassed and its content was transferred to a rotary evaporator, where the n-hexane was evaporated off at 60° C. under a partial vacuum. The solid catalyst (J) which was ready for use was thus obtained in the form of a prepolymer powder consisting of particles with a mass-mean diameter of 250 microns and containing 80 g of polyethylene per milliatom of titanium.

EXAMPLE 5

600 ml of n-hexane and 60 g of a dry silica identical to that employed in Example 1 were introduced into a stainless steel 1-liter reactor fitted with a stirrer device rotating at 250 revolutions per minute, followed slowly over 1 hour by a mixture of 80 millimoles of dibutylmagnesium and 40 millimoles of triethylaluminium at a temperature of 20° C. At the end of this time the mixture was stirred at 20° C. for 1 hour. The solid product (K) thus obtained was washed three times, each time with 600 ml of n-hexane at 20° C., and contained 1.1 milliatoms of magnesium and 0.68 milliatoms of aluminium per gram of silica.

The reactor containing the solid product (K) in suspension in 600 ml of n-hexane was then heated to 50° C. 254 millimoles of tert-butyl chloride were introduced into the reactor slowly over 1 hour with stirring. At the end of this time the mixture was stirred at 50° C. for 1 hour and was then cooled to room temperature (20° C.). The solid product (L) obtained was washed three times, each time with 600 ml of n-hexane at 20° C. and contained 1.1 milliatoms of magnesium, 0.4 milliatoms of aluminium and 2 milliatoms of chlorine per gram of silica, and substantially no basic functional group reductive towards titanium tetrachloride.

The reactor containing a quantity of the solid product (L) containing 30 g of silica in suspension in 600 ml of n-hexane was then heated to 50° C. 30 millimoles of titanium tetrachloride were introduced into the reactor slowly over 1 hour with stirring. At the end of this time the mixture was stirred at 50° C. for 1 hour and was then cooled to room temperature (20° C.). The solid product (M) obtained was washed three times, each time with 600 ml of n-hexane at 20° C. and contained 1.1 milliatoms of magnesium, 0.4 milliatoms of aluminum, 3.1 milliatoms of chlorine and 0.4 milliatoms of tetravalent titanium per gram of silica, and substantially no trivalent titanium.

2 liters of n-hexane, 10.8 millimoles of tri-n-octylaluminium and a quantity of the solid product (M) containing 6 milliatoms of titanium were introduced into a stainless steel 5-liter reactor fitted with a stirrer device rotating at 750 revolutions per minute and heated to 70° C. A volume of 400 ml of hydrogen, measured under normal conditions, was then introduced therein, followed by ethylene at a steady rate of 160 g/h for 3 hours. At the end of this time the reactor was degassed and its content was transferred to a rotary evaporator where n-hexane was evaporated off at 60° C. under a partial vacuum. The catalyst (N) which was ready for use was thus obtained in the form of a prepolymer powder consisting of particles which had a mass-mean diameter of 250 microns and contained 80 g of polyethylene per milliatom of titanium.

EXAMPLE 6

Preparation of a Catalyst

A support was employed, consisting of an "SG 332" Registered Trademark silica powder sold by W. R. Grace Company (United States of America), which had a specific surface area (BET) of 300 $m^2/g$ and a pore volume of 1.7 ml/g. It consisted of particles which had a mass-mean diameter of 80 microns. It was dried for 8 hours at 200° C. under an air atmosphere and a silica powder rid of free water and containing approximately 2 millimoles of hydroxyl groups per gram was obtained. All the subsequent operations were carried out under an inert nitrogen atmosphere.

600 ml of n-hexane and 60 g of dried silica were introduced into a stainless steel 1-liter reactor fitted with a stirrer rotating at 250 revolutions per minute, followed slowly over 1 hour by 60 millimoles of dibutylmagnesium at a temperature of 20° C.

The reactor was then heated to 50° C. and 120 millimoles of tert-butyl chloride were introduced therein slowly over 1 hour with stirring. While the temperature continued to be maintained at 50° C., 30 millimoles of titanium tetrachloride were introduced. At the end of this introduction the reactor was then heated to 80° C. and was kept stirred at this temperature for 2 hours. At the end of this time the reactor was cooled and a solid (O) was obtained, containing 0.5 milliatoms of titanium per gram of silica, in suspension in hexane containing less than 100 ppm (parts by weight per million) of titanium.

2 liters of n-hexane, 7.2 millimoles of tri-n-octylaluminium and a quantity of the solid product (O) containing 6 milliatoms of titanium were introduced into a stainless steel 5-liter reactor fitted with a stirrer rotating at 750 revolutions per minute and heated to 70° C. A volume of 280 ml of hydrogen, measured under normal conditions, was then introduced therein, followed by ethylene at a steady rate of 60 g/h for 4 hours. At the end of this time the reactor was degassed and its content was transferred to a rotary evaporator, where the n-hexane was evaporated off at 60° C. under a partial vacuum. The solid catalyst (P) which was ready for use was thus obtained in the form of a powder consisting of particles which had a mass-mean diameter of 250 microns and contained 40 g of polyethylene per milliatom of titanium.

EXAMPLE 7

Preparation of a Catalyst

A support was employed consisting of an "SG 332" Registered Trademark silica powder sold by W. R. Grace Company (United States of America), which had a specific surface area (BET) of 300 $m^2/g$ and a pore volume of 1.7 ml/g. It consisted of particles which had a mass-mean diameter of 80 microns. It was dried for 8 hours at 200° C. and a silica powder rid of free water and containing approximately 2 millimoles of hydroxyl group per gram was obtained. All the subsequent operations were carried out under an inert nitrogen atmosphere.

600 ml of n-hexane and 60 g of dried silica were introduced into a stainless steel 1-liter reactor fitted with a stirrer rotating at 250 revolutions per minute, followed slowly over 1 hour by 138.6 millimoles of dibutylmagnesium at a temperature of 20° C. The mixture thus obtained was stirred for 1 hour at 20° C. and a solid product (Q) was obtained.

The reactor was then heated to 50° C. and 277.2 millimoles of tert-butyl chloride were introduced therein slowly for 1 hour with stirring. At the end of this time the mixture continued to be stirred for 1 hour at 50° C. and was then cooled to room temperature (20° C.). A solid product (R) was obtained in suspension in n-hexane, containing chlorine and magnesium in a Cl/Mg atomic ratio equal to 1.69 and containing no functional group reductive towards titanium tetrachloride. The liquid phase of this suspension contained 500 ppm of tert-butyl chloride.

The reactor containing the suspension of the solid product (R) in n-hexane was then heated to 50° C. 69.3 millimoles of titanium tetrachloride were introduced therein slowly over 2 hours with stirring. The mixture thus obtained was kept stirred for 1 hour at 50° C. and was then cooled to room temperature. A solid (S) was thus obtained in suspension in n-hexane which, after three washings, each time with 600 ml of n-hexane, contained 2.18 milliatoms of magnesium, 5.7 milliatoms of chlorine and 0.65 milliatoms of tetravalent titanium per gram of silica, and substantially no trivalent titanium.

2 liters of n-hexane, 9.6 millimoles of tri-n-octylaluminium and a quantity of the solid product (S) containing 6 milliatoms of titanium were introduced into a stainless steel 5-liter reactor fitted with a stirrer rotating at 750 revolutions per minute and heated to 70° C. A volume of 280 ml of hydrogen, measured under normal conditions, was then introduced therein, followed by ethylene at a steady rate of 120 g/h for 4 hours. At the end of this time the reactor was degassed and its content was transferred to a rotary evaporator, where the n-hexane was evaporated off at 60° C. under a partial vacuum. The solid catalyst (T) which was ready for use was thus obtained in the form of a prepolymer powder consisting of particles which had a mass-mean diameter of 250 microns and contained 80 g of polyethylene per milliatom of titanium.

EXAMPLE 8

Preparation of a Catalyst

The procedure was exactly as in Example 7, apart from the fact that 277.2 millimoles of sec-butyl chloride were introduced into the reactor instead of tert-butyl chloride, and that solid products (R1) and (S1) were obtained and used instead of the solid products (R) and (S) respectively for preparing a solid catalyst (T1).

The solid product (R1) was obtained in suspension in n-hexane, containing chlorine and magnesium in a Cl/Mg atomic ratio equal to 1.57 and containing substantially no functional group reductive towards titanium tetrachloride. The liquid phase of this suspension contained 900 ppm of sec-butyl chloride.

The solid product (S1) contained 2.05 milliatoms of magnesium, 5.2 milliatoms of chlorine and 0.58 milliatoms of tetravalent titanium per gram of silica, and substantially no trivalent titanium.

The solid catalysts (T1) was obtained in the form of a prepolymer powder consisting of particles which had a mass-mean diameter of 250 microns and contained 80 g of polyethylene per milliatom of titanium.

EXAMPLE 9

Preparation of a Catalyst

The procedure was exactly as in Example 7, apart from the fact that 69.3 millimoles of vanadyl trichloride were introduced into the reactor instead of titanium tetrachloride. A solid product (S2) was thus obtained in suspension in n-hexane which, after three washings each with 600 ml of n-hexane, contained 2.1 milliatoms of pentavalent vanadium per gram of silica, and substantially no tetravalent vanadium.

2 liters of n-hexane, 9.6 millimoles of tri-n-octylaluminium and a quantity of the solid product (S2) containing 6 milliatoms of vanadium were introduced into a stainless steel 5-liter reactor fitted with a stirrer rotating at 750 revolutions per minute and heated to 70° C. A volume of 280 ml of hydrogen, measured under normal conditions, was then introduced therein, followed by ethylene at a steady rate of 120 g/h for 4 hours. At the end of this time the reactor was degassed and its content was transferred to a rotary evaporator, where the n-hexane was evaporated off at 60° C. under a partial vacuum. The solid catalysts (T2) which was ready for use was thus obtained in the form of prepolymer powder consisting of particles which had a mass-mean diameter of 250 microns and contained 80 g of polyethylene per milliatom of vanadium.

EXAMPLE 10 (COMPARATIVE)

Preparation of a Catalyst

The mixture prepared in Example 7, which contained the solid product (Q) was employed.

The reactor containing the solid product (Q) was heated to 50° C. and 277.2 millimoles of normal-butyl chloride were introduced therein slowly with stirring over 1 hour. At the end of this time the mixture thus obtained continued to be stirred at 50° C. for 1 hour and was then cooled to room temperature. The liquid phase of the suspension thus obtained contained approximately 50,000 ppm of normal-butyl chloride. The solid product (U) contained chlorine and magnesium in a Cl/Mg atomic ratio of approximately 0.2, as well as some basic functional groups capable of reducing titanium tetrachloride.

The reactor containing the suspension of the solid product (U) in n-hexane was heated to 50° C. 69.3 millimoles of titanium tetrachloride were introduced therein slowly over 2 hours with stirring. The mixture thus obtained was kept stirred for 1 hour at 50° C. and was then cooled to room temperature. A solid (V) was obtained as a suspension in hexane, and was washed three times, each time with 600 ml of n-hexane at 20° C. After these washings the solid (V) contained 2.0 milliatoms of magnesium, 5.1 milliatoms of chlorine, 0.41 milliatoms of tetravalent titanium and 0.39 milliatoms of trivalent titanium per gram of silica.

2 liters of n-hexane, 9.6 millimoles of tri-n-octylaluminium and a quantity of the solid product (V) containing 6 milliatoms of titanium were introduced into a stainless steel 5-liter reactor fitted with a stirrer rotating at 750 revolutions per minute and heated to 70°

C. A volume of 280 ml of hydrogen, measured under normal conditions, was then introduced therein, followed by ethylene at a steady rate of 120 g/h for 4 hours. At the end of this time the reactor was degassed and its content was transferred to a rotary evaporator, where the n-hexane was evaporated off at 60° C. under a partial vacuum. The solid catalyst (W) which was ready for use was thus obtained in the form of a prepolymer powder consisting of particles which had a mass-mean diameter of 250 microns and contained 80 g of polyethylene per milliatom of titanium.

EXAMPLE 11

Gas Phase Polymerization of Ethylene in a Fluidized-Bed Reactor 800 g of an anhydrous and deaerated polyethylene powder were introduced as a powder charge into a fluidized-bed reactor of 20 cm diameter. This powder was fluidized with the aid of an upward gas stream propelled at a velocity of 15 cm/s and consisting of a mixture of ethylene and hydrogen at a total pressure of 1.5 MPa. 8 millimoles of tri-n-octylaluminium were introduced into the reactor, followed by a quantity of a solid catalyst prepared according to the present invention, equivalent to 0.8 milliatoms of titanium. Only for the solid catalyst (P), 8 millimoles of triethylaluminium were used instead of tri-n-octylaluminium. The total pressure in the reactor was kept constant and equal to 1.5 MPa by ethylene addition and the polymerization reaction spent between 3 and 5 hours.

Table 1 shows, according to the catalysts used, the operating conditions of the ethylene polymerization and the characteristics of the polyethylene powders obtained. By way of comparison, instead of introducing the catalyst (F) prepared according to the present invention, the intermediate solid product (E) was introduced in a quantity which was equivalent in milliatoms of titanium and it was noted especially that the polyethylene powder obtained with the solid catalyst (F) exhibited a bulk density which was clearly higher than that of the polyethylene obtained with the intermediate solid product (E).

EXAMPLE 12

Gas Phase Copolymerization of Ethylene With 1-Butene in a Fluidized-Bed Reactor 800 g of an anhydrous and deaerated powder of a copolymer of ethylene and 1-butene were introduced as a powder charge into a fluidized-bed reactor of 20 cm diameter. This powder was fluidized with the aid of an upward gas stream propelled at a velocity of 15 cm/s and consisting of a mixture of ethylene, 1-butene and hydrogen at a total pressure of 1.5 MPa. 8 millimoles of tri-n-octylaluminium were introduced into the reactor, followed by a quantity of a solid catalyst prepared according to the present invention, equivalent to 0.8 milliatoms of titanium. For the solid catalysts (T), (T1), (T2) and (W), 8 millimoles of triethylaluminium were used instead of tri-n-octylaluminium.

By way of comparison, instead of introducing the solid catalyst (G) prepared according to the present invention, the intermediate solid product (E) was introduced in a quantity which was equivalent in milliatoms of titanium. Also by way of comparison, instead of introducing the solid catalyst (T) prepared according to the present invention, the solid catalyst (W) of Comparative Example 10 prepared with the aid of a primary alkyl monochloride was introduced.

Table 2 shows the operating conditions of the copolymerizations of ethylene with 1-butene and the characteristics of the copolymer powders obtained. It was noted especially that the copolymer powder obtained with the solid catalyst (G) exhibited a bulk density which was markedly higher than that of the copolymer obtained with the intermediate solid product (E). Furthermore, it was noted that to obtain a copolymer of a given density, the ratio of the partial pressure of 1-butene to that of ethylene was markedly lower in the case of a solid catalyst prepared according to the present invention than in the case of an intermediate solid product prepared according to a process not comprising the fourth stage. It was also observed that the productivity in copolymer was markedly greater with the catalyst (T) according to the present invention than with the catalyst (W).

EXAMPLE 13

Preparation of a Catalyst

The "SG 332" Registered Trademark silica powder sold by W. R. Grace Company (United States of America) was dried for 8 hours at 200° C. under an air atmosphere to obtain a silica which was rid of free water and approximately contained 2 millimoles of hydroxyl group per gram. All the subsequent operations were carried out under an inert nitrogen atmosphere.

600 ml of n-hexane and 60 g of the dried silica were introduced into a stainless steel 1-liter reactor fitted with a stirrer rotating at 250 revolutions per minute, followed slowly over 1 hour by 190 millimoles of dibutylmagnesium at a temperature of 20° C. The mixture thus obtained was stirred for 1 hour at 20° C. and a solid product was obtained containing 1.55 milliatoms of magnesium per gram of silica. The reactor was then heated to 50° C. and 186 millimoles of tert-butyl chloride were introduced therein slowly for 1 hour with stirring. At the end of this time, the mixture continued to be stirred for 1 hour at 50° C. and was then cooled to room temperature (20° C.). A solid product (X) was obtained in suspension in n-hexane, containing chlorine and magnesium in a Cl/Mg atomic ratio equal to 1.6 and containing substantially no functional group reductive towards titanium tetrachloride. The liquid phase of this suspension contained 600 ppm of tert-butyl chloride.

The reactor containing the suspension of the solid product (X) in n-hexane was then heated to 50° C. 48 millimoles of titanium tetrachloride were introduced therein slowly over 2 hours with stirring. The mixture thus obtained was kept stirred for 1 hour at 50° C. and was then cooled to room temperature. A solid product (Y) was thus obtained in suspension in n-hexane which, after three washings, each time with 600 ml of n-hexane, contained 1.63 milliatoms of magnesium, 5 milliatoms of chlorine and 0.53 milliatoms of tetravalent titanium per gram of silica, and substantially no trivalent titanium.

2 liters of n-hexane, 9.6 millimoles of tri-n-octylaluminium and a quantity of the solid product (Y) containing 6 milliatoms of titanium were introduced into a stainless steel 5-liter reactor fitted with a stirrer rotating at 750 revolutions per minute and heated to 70° C. A volume of 280 ml of hydrogen, measured under normal conditions, was then introduced therein, followed by ethylene at a steady rate of 120 g/h for 4 hours. At the end of this time the reactor was degassed and its content was transferred to a rotary evaporator where the n-hexane was evaporated off at 60° C. under a partial vacuum. The solid catalyst (Z) which was ready for use was thus obtained in the form of a prepolymer powder consisting of particles which had a mass-mean diameter of 250 microns and contained 80 g of polyethylene per milliatom of titanium.

EXAMPLE 14 (COMPARATIVE)

Preparation of a Catalyst

The procedure was exactly as in Example 13, apart from the fact that the 186 millimoles of carbon tetrachloride were introduced into the reactor instead of tert-butyl chloride, and that solid products (X1) and (Y1) were obtained and used for preparing a solid catalyst (Z1) instead of the solid products (X) and (Y) respectively.

The solid product (X1) was obtained in suspension in n-hexane, containing chlorine and magnesium in a Cl/Mg atomic ratio equal to 0.97 and containing functional groups reductive towards titanium tetrachloride. The liquid phase of this suspension contained a lot of chlorine-containing organic compounds.

The solid product (Y1) contained 1.72 milliatoms of magnesium, 3.4 milliatoms of chlorine, 0.45 milliatoms of tetravalent titanium and 0.1 milliatoms of trivalent titanium per gram of silica.

The solid catalyst (Z1) was obtained in the form of a prepolymer powder consisting of particles which had a mass-mean diameter of 250 microns and contained 80 g of polyethylene per milliatom of titanium.

EXAMPLE 15

Gas Phase Polymerization of Ethylene in a Fluidized-Bed Reactor

The procedure was exactly as in Example 12, apart from the use of the solid catalyst (Z). By way of comparison, instead of using the solid catalyst (Z) prepared according to the present invention, the solid catalyst (Z1) was used.

Table 3 shows the operating conditions of the ethylene polymerization and the characteristics of the polyethylene powders obtained. It was noted especially that the productivity of the solid catalyst (Z1) was markedly lower than that of the solid catalyst (Z).

EXAMPLE 16

Gas Phase Copolymerisation of Ethylene with Butene-1 in a Fluidized-Bed Reactor The procedure was exactly as in Example 12, apart from the use of the solid catalyst (P) in a quantity equivalent to 0.8 milliatom of titanium, the use of 8 millimoles of tri-n-octylaluminium, at a temperature of 95° C., with a mixture of ethylene, butene-1 and hydrogen, containing 10% (by volume) of hydrogen, the ratio ($pC_4/pC_2$) of the partial pressure of butene-1 to that of ethylene being of 0.03.

In these conditions, a copolymer of ethylene with 2% by weight of butene-1 was obtained in the form of a powder of a bulk density of 0.43 g/cm$^3$.

EXAMPLE 17

Gas Phase Copolymerisation of Ethylene with Butene-1 in a Fluidized-Bed Reactor The procedure was exactly as in Example 16, apart from the ratio ($pC_4/pC_2$) of 0.05.

In these conditions, a copolymer of ethylene with 3.3% by weight of butene-1 was obtained in the form of a powder of a bulk density of 0.42 g/cm$^3$.

EXAMPLE 18

Gas Phase Copolymerisation of Ethylene with Methyl-4-Pentene-1 in a Fluidized-Bed Reactor The procedure was exactly as in Example 12, apart from the use of the solid catalyst (P) in a quantity equivalent to 0.8 milliatom of titanium, the use of 8 millimoles of tri-n-octylaluminium, at a temperature of 70° C., with a mixture of ethylene, methyl-4-pentene-1 and hydrogen, containing 10% (by volume) of hydrogen, the ratio ($pC_6/pC_2$) of the partial pressure of methyl-4-pentene-1 to that of ethylene being of 0.05.

In these conditions, a copolymer of ethylene with 4.8% by weight of methyl-4-pentene-1 was obtained in the form of a powder of a bulk density of 0.41 g/cm$^3$.

EXAMPLE 19

Gas Phase Copolymerisation of Ethylene with Methyl-4-Pentene-1 in a Fluidized-Bed Reactor The procedure was exactly as in the Example 18, apart from the ratio ($pC_6/pC_2$) of 0.1.

In these conditions, a copolymer of ethylene with 9.5% by weight of methyl-4-pentene-1 was obtained in the form of a powder of a bulk density of 0.38 g/cm$^3$.

TABLE 1

| | Polymerization of ethylene | | | | | |
|---|---|---|---|---|---|---|
| Solid catalyst or solid product | Temperature (°C.) | % H2 (in volume) | Productivity | MI$_{2.16}$ g/10 min | Density (g/cm$^3$) | BD (g/cm$^3$) |
| (D) | 100 | 26 | 3300 | 1.9 | 0.96 | 0.42 |
| (F) | 90 | 39 | 3100 | 2.5 | 0.97 | 0.40 |
| (E) (comparative) | 90 | 39 | 3200 | 2.4 | 0.97 | 0.30 |
| (J) | 90 | 40 | 3600 | 1 | 0.96 | 0.38 |
| (P) | 90 | 40 | 3050 | 1.1 | 0.96 | 0.36 |

TABLE 2

| | Copolymerization of ethylene with 1-butene | | | | | | | |
|---|---|---|---|---|---|---|---|---|
| Solid catalyst or solid product | Temperature (°C.) | % H$_2$ in (volume) | pC$_4$/pC$_2$ | Productivity | MI$_{2.16}$ g/10 min | Density (g/cm$^3$) | % C$_4$ by weight in the copolymer | BD (g/cm$^3$) |
| (G) | 85 | 20 | 0.07 | 4560 | 1.8 | 0.943 | 3.6 | 0.41 |
| (E) (comparative) | 85 | 20 | 0.08 | 4000 | 1.0 | 0.948 | 2.7 | 0.28 |
| (G) | 85 | 24 | 0.04 | 4230 | 1.8 | 0.947 | 2.8 | 0.39 |
| (G) | 80 | 9 | 0.30 | 5800 | 1.3 | 0.921 | 7.6 | 0.43 |
| (G) | 80 | 9 | 0.32 | 7150 | 1.8 | 0.914 | 9.4 | 0.38 |
| (T) | 85 | 29 | 0.053 | 3841 | 5.04 | 0.945 | 3.3 | 0.32 |
| (T1) | 85 | 25 | 0.045 | 3950 | 4.1 | 0.945 | 3.2 | 0.34 |
| (T2) | 85 | 25 | 0.045 | 3120 | 3.3 | 0.944 | 3.0 | 0.35 |

TABLE 2-continued

Copolymerization of ethylene with 1-butene

| Solid catalyst or solid product | Temperature (°C.) | % H$_2$ in (volume) | pC$_4$/pC$_2$ | Productivity | MI$_{2.16}$ g/10 min | Density (g/cm$^3$) | % C$_4$ by weight in the copolymer | BD (g/cm$^3$) |
| --- | --- | --- | --- | --- | --- | --- | --- | --- |
| (W) (comparative) | 85 | 25 | 0.044 | 1960 | 1.9 | 0.944 | 2.1 | 0.37 |

We claim:

1. A process for polymerising ethylene or copolymerising ethylene with at least one alpha-olefin containing 3 to 8 carbon atoms in the presence of a prepolymerised catalyst comprising atoms of chlorine, magnesium, aluminium and/or zinc, and titanium and/or vanadium, and a refractory oxide, and containing per milliatom of titanium or vanadium or titanium plus vanadium, from 1 to 200 g of polyethylene or copolymer of ethylene with a minor amount of an alpha-olefin containing 3 to 8 carbon atoms, from 0.2 to 15 g of the refractory oxide, from 1 to 10 milliatoms of magnesium, and from 0.1 to 20 milliatoms of aluminium or zinc or aluminium plus zinc.

2. A process according to claim 1, wherein the prepolymerised catalyst comprises from 0 to a value less than 0.2 millimole of an electron-donor compound per milliatom of titanium or vanadium or titanium plus vanadium.

3. A process according to claim 1, wherein the prepolymerised catalyst consists of solid particles having a mass-mean diameter of 50 to 500 microns.

4. A process according to claim 1, wherein the polymerisation or copolymerisation of ethylene is carried out in a gas phase, in the presence of at least one cocatalyst chosen from organoaluminium and organozinc compounds, at a temperature of 20° to 110° C., and under a total pressure of 0.5 to 5 MPa.

5. A process according to claim 4, wherein the polymerisation or copolymerisation of ethylene is carried out in a fluidized-bed reactor.

6. A process according to claim 4, wherein the cocatalyst is introduced into the gas phase polymerisation medium simultaneously with or separately from the prepolymerised catalyst in an amount such that the atomic ratio of the metal(s) aluminum and/or zinc of the cocatalyst to titanium or vanadium or titanium plus vanadium is from 0.1 to 10.

* * * * *

UNITED STATES PATENT AND TRADEMARK OFFICE
CERTIFICATE OF CORRECTION

PATENT NO. : 5,166,281
DATED : November 24, 1992
INVENTOR(S) : Claude Chamla and Erick Daire It is certified that error appears in the above-indentified patent and that said Letters Patent is hereby corrected as shown below:

Col. 6, lines 17-23, correct the formula to read $$--(CH_2)_n C\genfrac{}{}{0pt}{}{Cl}{R^8}--$$

Col. 23-24, after "Table 2 - continued" insert Table 3 reading as follows:

UNITED STATES PATENT AND TRADEMARK OFFICE
CERTIFICATE OF CORRECTION

PATENT NO. : 5,166,281
DATED : November 24, 1992
INVENTOR(S) : Claude Chamla and Erick Daire It is certified that error appears in the above-indentified patent and that said Letters Patent is hereby corrected as shown below:

TABLE 3

POLYMERIZATION OF ETHYLENE

| Solid catalyst | Temperature (°C) | % $H_2$ (in volume) | Productivity | $MI_{2\ 16}$ | BD (g/cm$^3$) |
|---|---|---|---|---|---|
| (Z) | 90 | 39 | 3050 | 1 | 0.39 |
| (Z1) Comparative | 90 | 39 | 2090 | 3 | 0.35 |

Signed and Sealed this

Twenty-first Day of June, 1994

Attest:

BRUCE LEHMAN

*Attesting Officer*     *Commissioner of Patents and Trademarks*